United States Patent
Paulraj

(10) Patent No.: US 11,106,781 B2
(45) Date of Patent: Aug. 31, 2021

(54) SECONDARY OS DEVICE UNLOCKING SYSTEM

(71) Applicant: Dell Products L.P., Round Rock, TX (US)

(72) Inventor: Deepaganesh Paulraj, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 383 days.

(21) Appl. No.: 16/265,121

(22) Filed: Feb. 1, 2019

(65) Prior Publication Data

US 2020/0250293 A1    Aug. 6, 2020

(51) Int. Cl.
*G06F 21/44*     (2013.01)
*G06F 9/4401*    (2018.01)

(52) U.S. Cl.
CPC ............ *G06F 21/44* (2013.01); *G06F 9/4401* (2013.01); *G06F 9/441* (2013.01); *G06F 9/4406* (2013.01); *G06F 9/4408* (2013.01)

(58) Field of Classification Search
CPC ...... G06F 21/44; G06F 9/4401; G06F 9/4406; G06F 9/4408; G06F 9/441
See application file for complete search history.

(56) References Cited

U.S. PATENT DOCUMENTS

| | | | | |
|---|---|---|---|---|
| 7,082,615 B1 * | 7/2006 | Ellison | ..................... | G06F 9/468 380/44 |
| 7,624,279 B2 * | 11/2009 | Davis | ..................... | G06F 21/31 713/183 |
| 8,332,928 B2 * | 12/2012 | Ibrahim | ................ | H04L 63/107 726/17 |
| 8,566,603 B2 * | 10/2013 | Cox | ......................... | G06F 21/80 713/183 |
| 9,218,301 B2 * | 12/2015 | Gupta | ..................... | H04L 63/10 |

(Continued)

FOREIGN PATENT DOCUMENTS

KR        100621095 B1     9/2006

OTHER PUBLICATIONS

Müller, T., et al., A Systematic Assessment of the Security of Full Disk Encryption, IEEE Transactions on Dependable and Secure Computing, vol. 12, No. 5, Sep./Oct. 2015, pp. 491-503, [retrieved on Jun. 11, 2021], Retrieved from the Internet: <URL:http://ieeexplore.ieee.org/>.*

(Continued)

*Primary Examiner* — Geoffrey R St Leger
(74) *Attorney, Agent, or Firm* — Haynes and Boone, LLP

(57) ABSTRACT

A secondary OS device unlocking system includes a key management system and a server device. The server device includes a storage device storing primary OS information, a remote access controller device, and a BIOS. During server device initialization operations, the BIOS sends the remote access controller device a request to unlock a storage device using a storage device locking key stored in the key management system. In response to the storage device not being unlocked, the BIOS retrieves secondary OS information and boots using the secondary OS information to provide the secondary OS that retrieves the storage device locking key and uses it to unlock the storage device, and then performs a reboot operation. The BIOS then retrieves the primary OS information from the unlocked storage device, and boots using the primary OS information to provide a primary OS.

20 Claims, 4 Drawing Sheets

(56) References Cited

U.S. PATENT DOCUMENTS

| | | | | |
|---|---|---|---|---|
| 9,846,617 | B2* | 12/2017 | Rahardjo | G06F 9/4406 |
| 10,460,110 | B1* | 10/2019 | Allo | G06F 3/0622 |
| 2007/0005951 | A1* | 1/2007 | Davis | G06F 21/31 |
| | | | | 713/2 |
| 2010/0106928 | A1* | 4/2010 | Toda | G06F 12/1458 |
| | | | | 711/163 |
| 2011/0022832 | A1* | 1/2011 | Motohama | G06F 9/441 |
| | | | | 713/2 |
| 2011/0307709 | A1* | 12/2011 | Cox | G06F 21/80 |
| | | | | 713/183 |
| 2015/0121028 | A1* | 4/2015 | Gupta | G06F 21/78 |
| | | | | 711/164 |
| 2016/0283404 | A1* | 9/2016 | Xing | G06F 9/4406 |
| 2016/0328300 | A1* | 11/2016 | Rahardjo | G06F 11/1469 |
| 2017/0237560 | A1* | 8/2017 | Mueller | H04L 9/3263 |
| | | | | 713/168 |
| 2019/0057220 | A1* | 2/2019 | Murase | G06F 21/575 |

OTHER PUBLICATIONS

Zhu, J-H, et al., PC Lock Software Design Based On Removable Storage Device and Dynamic Password, 2nd International Conference on Computer Engineering and Technology, Apr. 16-18, 2010, pp. 326-329, [retrieved on Apr. 9, 2021], Retrieved from the Internet: <URL:http://ieeexplore.ieee.org/>.*

* cited by examiner

SECONDARY OS DEVICE UNLOCKING SYSTEM

BACKGROUND

The present disclosure relates generally to information handling systems, and more particularly to a secondary operating system for unlocking devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system), and use those device locking keys to unlock managed devices for use. However, the locking of managed devices via device locking keys can raise issues.

For example, server systems may include storage devices that are locked using storage device locking keys provided via the key management systems discussed above, and those storage devices may store boot information that is used by a BIOS in the server system for booting the server system such that it may enter a runtime state. As such, upon initialization of the server system, the remote access controller discussed above must retrieve a storage device locking key as discussed above in order to provide for the unlocking of a storage device so that boot information may be retrieved and use to boot the server system. However, in the event that the remote access controller and/or the key management system are unavailable, the boot information is unavailable due to the inability to retrieve the storage device locking key for unlocking the storage device, which prevents the booting of the server system. As such, recovery techniques provided by a primary operating system (e.g., provided by the Central Processing Unit (CPU) in the server system during runtime) will be unavailable as well, resulting in server system downtime until the remote access controller and/or the key management system become available.

Accordingly, it would be desirable to provide an improved device locking system.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) that is configured, during initialization operations, to: send, to a remote access controller device, a request to unlock a storage device using a storage device locking key that is stored in a key management system; retrieve, in response to the storage device not being unlocked, secondary OS information for providing a secondary OS; boot using the secondary OS information to provide the secondary OS that is configured to: retrieve the storage device locking key; unlock, using the storage device locking key, the storage device; and perform, subsequent to unlocking the storage device, a reboot operation; retrieve, following the reboot operation and from the storage device that was unlocked by the secondary OS, the primary OS information; and boot using the primary OS information to provide the primary OS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or a video display. The information handling system may also include one or more buses operable to transmit communications between the various hardware components.

Figure 1:
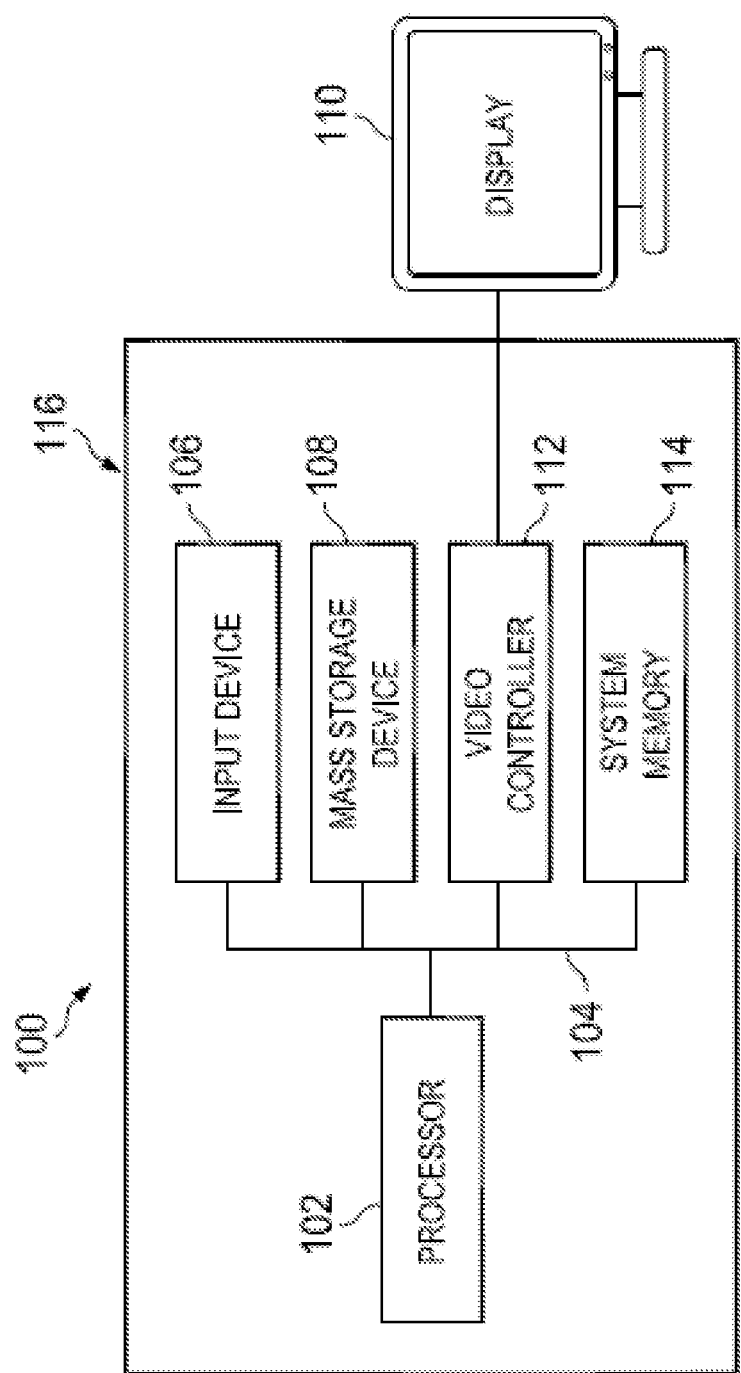
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
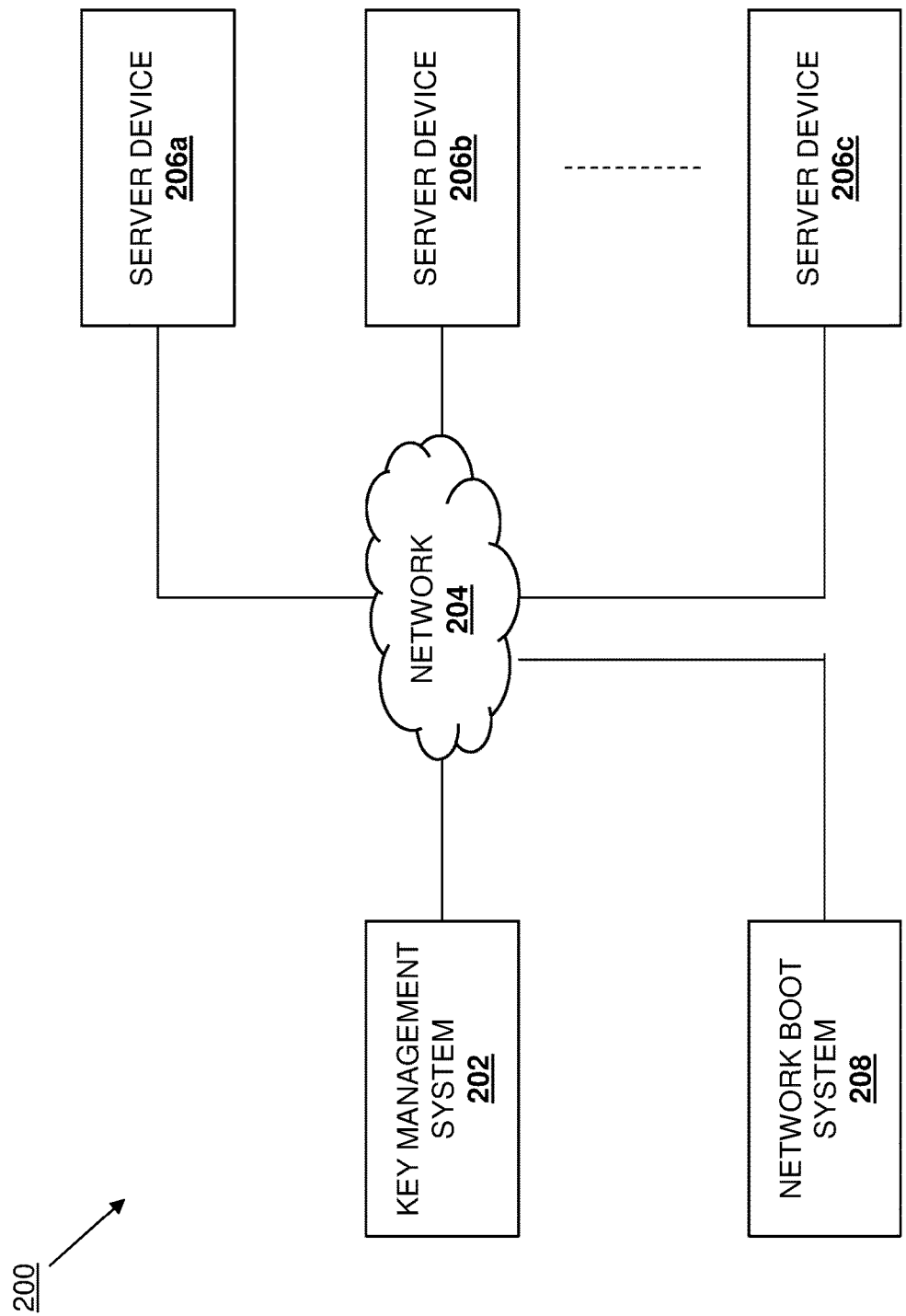
FIG. 2 is a schematic view illustrating an embodiment of a secondary OS device unlocking system.

Referring now to FIG. 2, an embodiment of a secondary Operating System (OS) device locking system 200 is illustrated. As discussed below, the secondary OS device locking system 200 may include a management system that may be provided by one or more of the IHSs 100 discussed above with reference to FIG. 1, and/or that may include any or all of the components of the IHS 100. In the illustrated embodiment, the management system is provided by a key management system 202 that may include one or more server devices, although other computing devices may be utilized to provide the management system while remaining within the scope of the present disclosure as well. In a specific example, the key management system 202 may be provided by one or more server devices that are configured according to the Key Management Interoperability Protocol (KMIP) to act as a KMIP server, and one of skill in the art in possession of the present disclosure will recognize that the KMIP is an extensible communication protocol that defines message formats for the manipulation of cryptographic keys via server device(s) providing the key management system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the secondary OS device locking system 200, one of skill in the art in possession of the present disclosure will recognize that keys may be managed according to the teachings of the present disclosure via a variety of key management protocols while remaining within the scope of the present disclosure as well.

In the illustrated embodiment, the key management system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206a, 206b, and up to 206c, each of which is coupled through the network 204 to the key management system 202. In some of the specific examples discussed below, the server devices 206a-c may be configured according to the KMIP to act as the KMIP clients discussed above, and/or configured to operate as a Pre-boot eXecution Environment (PXE) clients, discussed in further detail below.

A network boot system 208 is also coupled to the network 204. In an embodiment, the network boot system 208 may be provided by the IHS 100 discussed above with reference to FIG. 1, and/or may include any or all of the components of the IHS 100. In a specific example, the network boot system 208 may be provided by one or more PXE servers that are configured to operate with PXE clients (e.g., provided by the server devices 206a-c) to provide for the booting of those PXE clients over the network 204. As would be understood by one of skill in the art in possession of the present disclosure, PXE clients may only require a PXE-capable Network Interface Controller (NIC) in order to boot via a set of industry-standard network protocols such as the Dynamic Host Configuration Protocol (DHCP), the Trivial File Transfer Protocol (TFTP), and/or other protocols known in the art. In some examples, the network boot system 208 may store the secondary OS information that is described below as being provided to the server device 206a, while in other examples the network boot system 208 may retrieve the secondary OS information described below from another device (e.g., the server devices 206b or 206c) coupled to the network 204 before providing that secondary OS information to the server device 206a. While one of skill in the art in possession of the present disclosure will recognize that the embodiment discussed below describes a datacenter including a datacenter network that couples together the key management system, the server devices, and the network boot system, any of a variety of managed systems may be coupled to a management system via a network while operating according to the teachings of the present disclosure, and those embodiments are envisioned as falling within the scope of the present disclosure as well.

Figure 3:
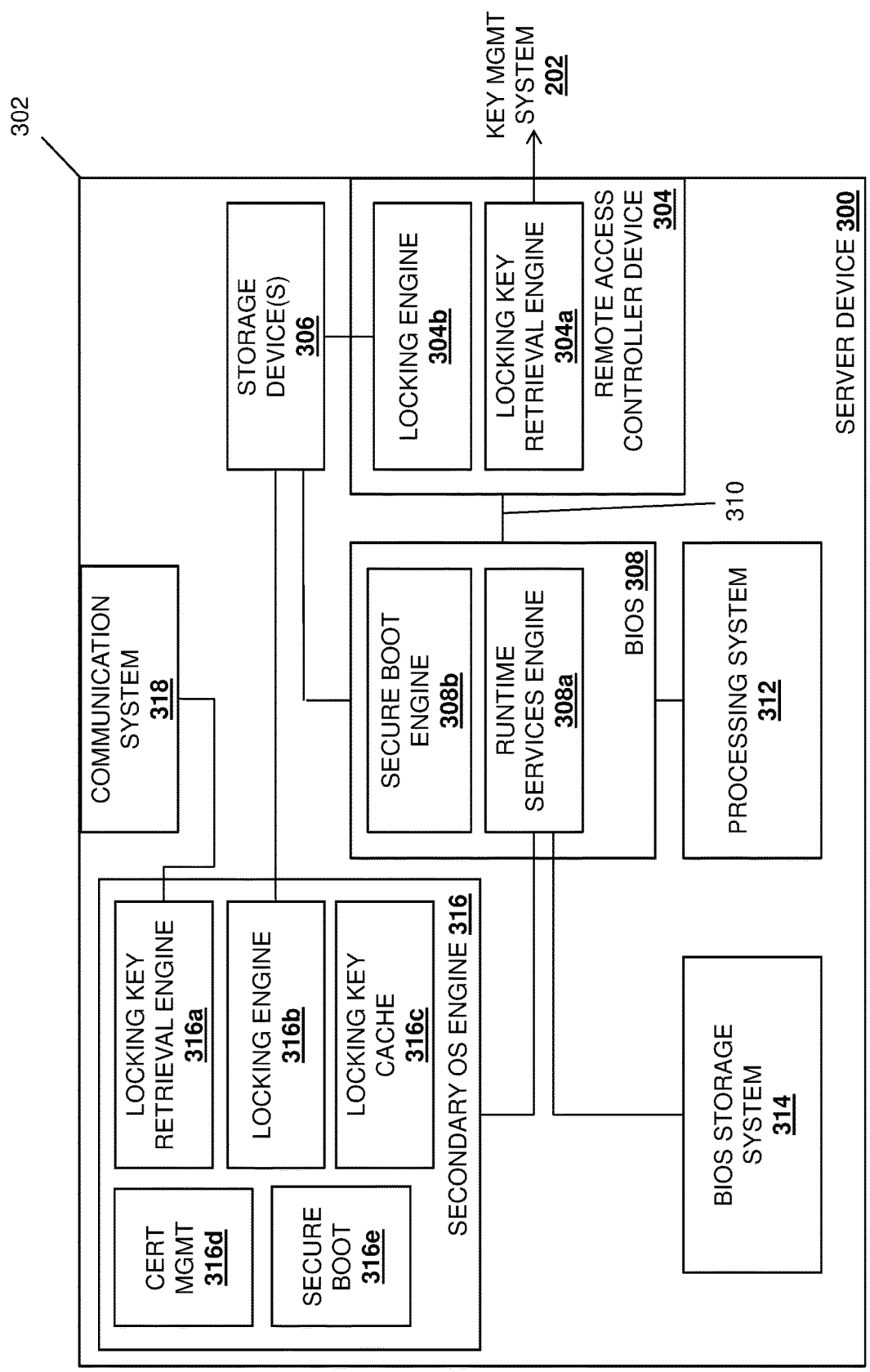
FIG. 3 is a schematic view illustrating an embodiment of a server device that may be provided in the secondary OS device unlocking system of FIG. 2.

Referring now to FIG. 3, an embodiment of a managed system provided by a server device 300 is illustrated. The server device 300 may be any or all of the server devices 206a-c discussed above with reference to FIG. 2 and, as such, may be provided by the IHS 100 discussed above with reference to FIG. 1, and/or may include any or all of the components of the IHS 100. In the illustrated embodiment, the server device 300 includes a chassis 302 that houses the components of the server device 300, only some of which are illustrated in FIG. 3. For example, in the illustrated embodiment, the chassis 302 houses a remote access controller device 304. In a specific example, the remote access controller device 304 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server device 300, while providing a browser-based-interface and/or command-line-interface for allowing users to manage and monitor the server device 300.

As discussed below, the remote access controller device 304 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller that is configured to perform the functionality of the remote access controllers and remote access controller devices discussed below. As illustrated in FIG. 2, the remote access controller device 304 may include connectivity to the key management system 202 (e.g., an Enterprise Key Management System (EKMS)). For example, the remote access controller provided by the remote access controller device 304 may provide a locking key retrieval engine 304a that is configured to utilize the connectivity to the key management system 202 to retrieve the device locking keys as discussed herein. In a specific example, the locking key retrieval engine 304a may be provided by a KMIP client as discussed above. In addition, the remote access controller provided by the remote access controller device 304 may provide a locking engine 304b that is configured to utilize the device locking keys retrieved by the locking key retrieval engine 304a in order to unlock devices as discussed below. For example, the chassis 302 may house one or more storage devices 306 that are coupled to the remote access controller device 304 and that may be unlocked by the locking engine 304b as discussed below.

In the illustrated embodiment, the chassis 302 also houses a BIOS 308 that is coupled to the storage device(s) 306, as well as to the remote access controller device 304 via, for example, a Shared Memory Access (SMA) channel 310. As would be understood by one of skill in the art in possession of the present disclosure, a BIOS 308 may be provided by nonvolatile firmware and may be used to perform hardware initialization during a booting process (e.g., power-on startup) for the server device 300, as well as provide runtime services for operating systems and applications running on the server device 300 during runtime. Furthermore, while discussed as a BIOS below, one of skill in the art in possession of the present disclosure will recognize that the BIOS 306 may be provided according to the Unified Extensible Firmware Interface (UEFI) specification, which defines a software interface between an operating system and platform firmware in the server device 300, and was provided to replace the BIOS firmware interface while providing legacy support for BIOS services. As discussed below, the BIOS 306 may include a BIOS processing system (not illustrated, but which may include the processor 102 discussed above with reference to FIG. 1 and/or components with similar processing functionality) and a BIOS memory system (not illustrated, but which may include the memory 114 discussed above with reference to FIG. 1 and/or components with similar memory functionality) that is coupled to the BIOS processing system and that includes instructions that, when executed by the BIOS processing system, cause the BIOS processing system to provide a runtime services engine 308a that is configured to perform the operations of the runtime services engines and the BIOS discussed below, as well as the secure boot engine 308b that is configured to perform the operations of the secure boot engines and BIOS discussed below.

The chassis 302 may also house a processing system 312 that is coupled to the BIOS 308, and that may be provided by a Central Processing Unit (CPU) that is configured to provide a primary OS for the server device 300 during runtime operations. The chassis 302 also includes a BIOS storage system 314 that is coupled to the BIOS 308 (e.g., the runtime services engine 308a in the BIOS 308), and that may be provided by a Serial Peripheral Interface (SPI) storage device (e.g., a BIOS flash device), an Internal Dual Secure Digital Module (IDSDM) storage device, a virtual flash (vFlash) partition storage device, and/or a variety of other BIOS storage systems known in the art.

As discussed below, the BIOS 308 may retrieve secondary OS information and make that secondary OS information available to the processing system 312 to provide a secondary OS engine 316 that is coupled to the runtime services engine 308a and configured to provide the secondary OS discussed below. For example, the secondary OS discussed below may be a hidden OS that is available to the BIOS 308 but not visible to a user of the server device 300 (e.g., the device from which the hidden OS information for the hidden OS is retrieved is not listed in a device boot order.) Furthermore, the secondary OS discussed below may be a UEFI-compliant secure-boot-enabled OS that is provided by drivers and/or other code that may be signed with public keys (e.g., the secure boot certificate public keys discussed below) and verified as secured (e.g., via the secure boot certificate private keys discussed below) before being utilized to provide the secondary OS. Further still, the secondary OS discussed below may be a micro embedded OS that is provided by minimal OS code that is configured to perform the limited device key retrieval functionality (and other functionality) discussed below. For example, the micro embedded secondary OS may include only the key retrieval functionality, storage device unlocking functionality, and reboot functionality described below, while not being configured to perform many of the functions known in the art that are available from a primary OS. In a specific embodiment, the secondary OS may be provided by LINUX®. As such, in specific examples, the secondary OS may be a hidden, UEFI-compliant secure-boot-enabled, micro embedded LINUX® OS, although other secondary OSs may fall within the scope of the present disclosure as well.

As discussed below, secondary OS engine 316 may include a locking key retrieval engine 316a that is coupled to a communication system 318 that is included in the chassis 302. For example, the communication system 318 may be provided by a Network Interface Controller (NIC), a wireless communication system (e.g., a BLUETOOTH® communication system, a Near Field Communication (NFC) system, a WiFi communication system, and/or other wireless communication components known in the art), and/or other communication components that would be apparent to one of skill in the art in possession of the present disclosure. For example, the locking key retrieval engine 316a provided by the secondary OS engine 316 may include a KMIP client as discussed above. Furthermore, the secondary OS engine 316 may include a locking engine 316b that is coupled to the storage device(s) 306, and that may be provided by a secure unlocking application included in the secondary OS engine 316. In the illustrated embodiment, the secondary OS engine 316 may also include a locking key cache 316c that may be provided by a UEFI runtime cache, a certificate management subsystem 316d that may be configured to manage the certificates discussed below, and a secure boot subsystem 316e that is configured to perform the secure boot operations performed for the secondary OS discussed below. However, while a specific server device 300 has been illustrated and described, one of skill in the art in possession of the present disclosure will recognize that server devices may include a variety of components and/or component configurations for performing conventional server device functionality, as well as the functionality discussed below, while remaining within the scope of the present disclosure as well.

Figure 4:
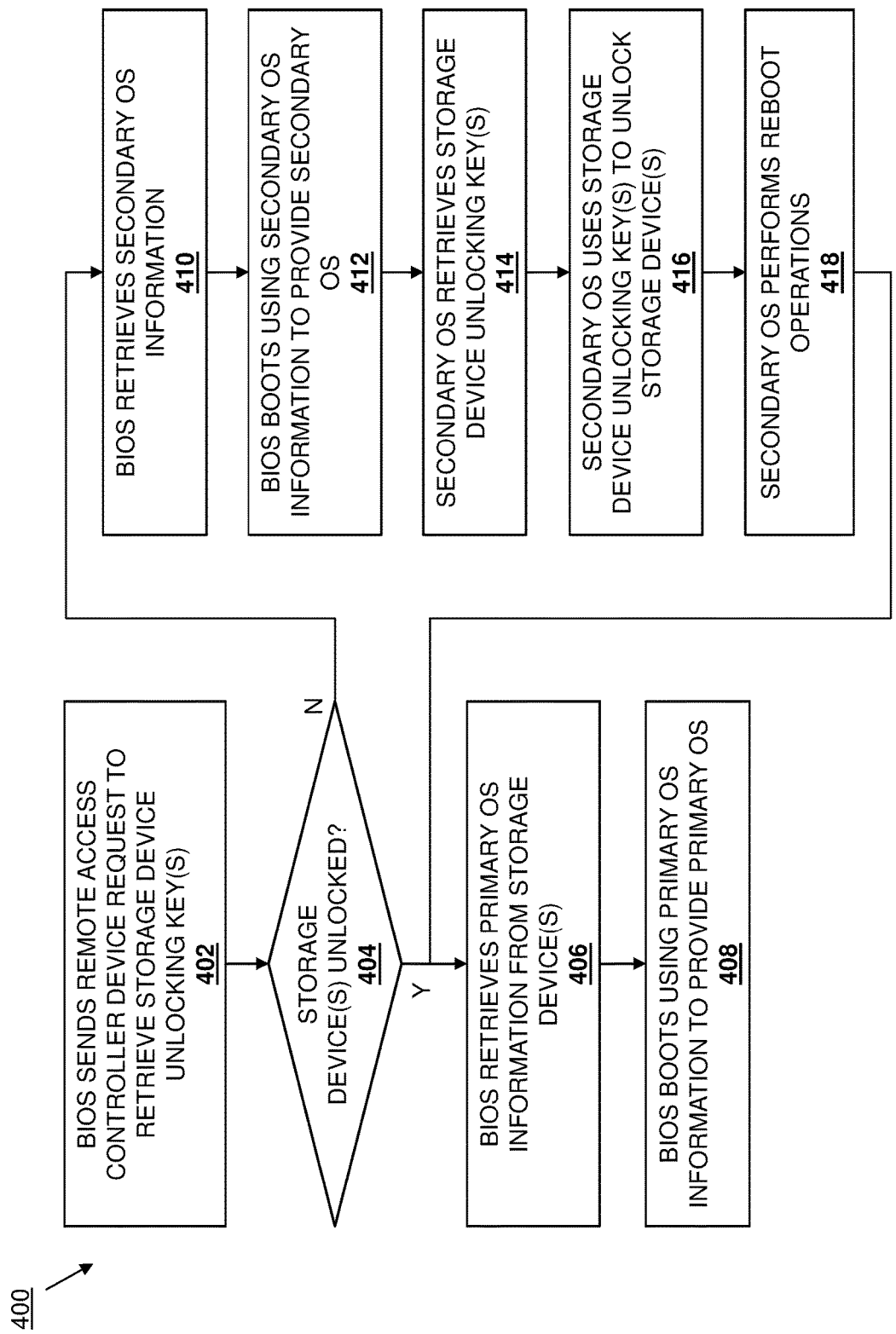
FIG. 4 is a flow chart illustrating an embodiment of a method for providing for the unlocking of devices using a secondary OS.

Referring now to FIG. 4, an embodiment of a method 400 for providing for the unlocking of devices using a secondary OS is illustrated. As discussed below, embodiments of the systems and methods of the present disclosure include a hidden, UEFI-compliant secure-boot-enabled, micro embedded secondary Operating System (OS) that is provided by secondary OS information that may be stored in a BIOS SPI storage device, IDSDM storage device, or a vFlash partition storage device connected to the BIOS, or that may be available through a network via, for example, a Pre-boot eXecution Environment (PXE) system. A remote access controller device may provide a secure boot certificate for secondary OS information in a BIOS secure database section in order to enable secure booting using the secondary OS information to provide the secondary OS, and may encrypt a device locking key for a storage device using the secure boot certificate, and provide the resulting encrypted device locking key to the BIOS for storage in a BIOS UEFI runtime storage. During boot operations, the BIOS may request the remote access controller device to unlock the storage device using the storage device locking key stored in a network-connected key management system so that boot information needed to complete the boot operations may be accessed. If the storage device is not unlocked due to, for example, remote access controller device unavailability, key management system unavailability, and/or remote access controller device/key management system network connection unavailability, the BIOS may then re-enumerate a boot order to allow boot operations to be performed using the BIOS SPI storage device, IDSDM storage device, vFlash partition storage device, or PXE booting system discussed above, which provides for booting using the secondary OS information stored thereon to provide the secondary OS. As discussed above, the secondary OS provided by the secondary OS information may be hidden in that the storage location of the secondary OS information may not be visible to a user of the server device 206/300, but may be provided in the re-enumerated boot order such that is accessed during boot operations.

If a network connection and the key management system are available, the secondary OS may then retrieve the device locking key from the key management system and use it to unlock the storage devices. If the network connection and/or key management system are unavailable, the secondary OS may use the secure boot certificate in the BIOS secure database section to decrypt the encrypted device locking key in the BIOS UEFI runtime storage, and use the decrypted device locking key to unlock the storage device. The secondary OS then performs a reboot operation, which loads the BIOS so that the BIOS may retrieve primary OS information from the storage devices and boot using that primary OS information in order to provide a primary OS.

In some embodiments, prior to the method 400, the secondary OS information that is configured to provide for the secondary OS as described below may be provided on the BIOS storage system 314. For example, as discussed below, the BIOS storage system 314 may be provided by a BIOS SPI storage device, an IDSDM storage device, or a vFlash partition storage device that is included in or coupled to the server device 300, and the secondary OS information may be stored on that BIOS storage system 314. In other embodiments, the secondary OS information that is configured to provide for the secondary OS as described below may be provided on the network boot system 208. For example, the network boot system 208 may be a PxE system, and the secondary OS information may be stored on that PxE system 314, or accessible to that PCE system via another device connected to the network 204. As discussed above, the secondary OS information may provide a secondary OS that is hidden, UEFI-compliant secure-boot-enabled, micro embedded, and provided by LINUX open source software, and one of skill in the art in possession of the present disclosure will recognize how the secondary OS information may be stored in the BIOS storage system 314, the network boot system 208, in a device accessible to the network boot system 208, and/or at any other storage location accessible to the BIOS 312 while remaining within the scope of the present disclosure. In a specific example, in order to provide the secondary OS as UEFI-compliant secure-boot-enabled, the secondary OS information and/or secondary OS may be associated with a secure boot certificate, and the remote access controller device 304 may provide that secure boot certificate to the BIOS 308 for storage in a BIOS secure boot database section accessible to the secure boot engine 308b.

Furthermore, at any of a variety of times prior to and/or during the method 400, device locking keys may be generated for managed devices utilized in the secondary OS device locking system 200. For example, the device locking keys discussed below may be provided by Key Encryption Keys (KEKs), although other device locking keys will fall within the scope of the present disclosure as well. In a specific example, the locking key retrieval engine 304a provided by the remote access controller device 304 included in the server device 206a/300 may operate as a KMIP client in cooperation with the key management system 202 operating as a KMIP server in order to generate storage device locking key(s) for the storage device(s) 306, with any or all of those storage device(s) 306 storing boot information that is used to perform booting operations for the server device 206a/300 and that may include the primary OS information used to provide the primary OS as discussed below (i.e., the boot information including the primary OS information may be used to boot the server device 206a/300 in order to provide the primary OS during runtime of the server device 206a/300). As such, the locking key retrieval engine 304a operating as a KMIP client may communicate with the key management system 202 operating as a KMIP server using a variety of techniques that would be apparent to one of skill in the art in possession of the present disclosure in order to generate respective storage device locking key(s) for each of the storage device(s) 306. Thus, the storage device locking key(s) may be used to lock the storage device(s) 306 such that any information stored thereon is inaccessible without the storage device locking key(s).

As discussed in further detail below, following the generation of the storage device locking key(s) and their use to lock the storage device(s) 306, and in the event that the remote access controller device 304, the key management system 202, and the network connection between the remote access controller device 304 and the key management system 202 is available during booting operations for the server device 206*a*/300, the remote access controller device 304 may operate as a KMIP client to retrieve the storage device locking key(s) from the key management system 202 operating as a KMIP server (e.g., by providing the KMIP server unique identifiers such as serial numbers for the storage device(s) 306), and use those device locking key(s) to unlock the storage device(s) 306 so that a BIOS in the server device 206*a*/300 may retrieve primary OS information that is stored on those storage device(s) 306 and use that primary OS information during the booting operations to provide a primary OS on the server device 206*a*/300.

However, in preparation for the event in which the remote access controller device 304, the key management system 202, and/or the network connection between the remote access controller device 304 and the key management system 202 are unavailable during booting operations for the server device 206*a*/300, the storage device locking key(s) generated for the storage device(s) 306 may be stored locally in the server device 206*a*/300 such that they are accessible to the BIOS 308. For example, the remote access controller device 304 may operate to encrypt the storage device locking key(s) with a secure boot certificate (e.g., a public key associated with the secure boot certificate provided with the secondary OS information/secondary OS as discussed above) in order to provide encrypted storage device locking key(s), and then transmit those encrypted storage device locking key(s) via the SMA channel 310 to the BIOS 308 for storage in a BIOS UEFI runtime storage that is available to the runtime services engine 308*a*. However, one of skill in the art in possession of the present disclosure will recognize that the storage device locking key(s) for the storage device(s) 306 may be stored in a variety of secure manners that will fall within the scope of the present disclosure as well.

The method 400 may begin at block 402 where a BIOS sends a remote access controller device a request to unlock storage device(s). In an embodiment, at block 402, the server device 206*a*/300 may power on, reset, or otherwise initialize and, in response, the BIOS 308 may be loaded and may begin boot operations. In response to the initialization of the server device 206*a*/300 and as part of the performance of boot operations by the BIOS 308, the BIOS 308 may require the boot information that is stored on the storage device(s) 306. However, as discussed above, the storage device(s) 306 may be locked, and thus the BIOS 308 may send a request to the remote access controller device 304 to unlock the storage device(s) 306 so that the boot information may be accessed. While the secondary OS device unlocking system of the present disclosure is described below as unlocking storage devices during booting operations when they are not unlocked following the request to the remote access controller device to perform such unlocking, one of skill in the art in possession of the present disclosure will recognize that the teachings of the present disclosure may provide for the unlocking of other types of devices at times other than during booting operations while remaining within the scope of the present disclosure as well.

The method 400 then proceeds to decision block 404 where the BIOS determines whether storage device(s) have been unlocked. In an embodiment, at decision block 404, the BIOS 308 may determine whether the storage device(s) 306 have been unlocked in response to the request sent at block 402. As discussed above, in the event that the remote access controller device 304, the key management system 202, and the network connection between the remote access controller device 304 and the key management system 202 are available during booting operations for the server device 206*a*/300, the locking key retrieval engine 304*a* in the remote access controller device 304 may operate as a KMIP client to retrieve the storage device locking key(s) from the key management system 202 operating as a KMIP server (e.g., by providing the KMIP server unique identifiers such as serial numbers for the storage device(s) 306). The locking engine 304*b* in the remote access controller device 304 may then operate to use the storage device locking key(s) to unlock the storage device(s) 306. While not described in detail herein, one of skill in the art in possession of the present disclosure will recognize how a KMIP client may operate in a variety of manners to retrieve device locking keys from a KMIP server, as well as how a locking engine such as an RTCEM may operate to unlock those devices using those device locking keys.

As such, in some embodiments, the BIOS 308 may determine that that storage device(s) 306 have been unlocked in response to determining that access to information stored on those storage device(s) 306 is available, while in other embodiments the BIOS 308 may determine that the storage device(s) 306 have not been unlocked in response to determining that access to information stored on those storage device(s) 306 is not available. In yet other embodiments, the BIOS 308 may determine that the storage device(s) 306 have not been unlocked in response to a storage device unlock timeout occurring without the storage device(s) 306 being unlocked, in response to a get-storage-device-locking-key timeout occurring without the storage device(s) being unlocked, and/or in response to a variety of other timeouts that will be apparent to one of skill in the art in possession of the present disclosure. However, one of skill in the art in possession of the present disclosure will recognize that the BIOS 308 may determine that the storage device(s) 306 have been unlocked (or not been unlocked) in a variety of manners that will fall within the scope of the present disclosure as well.

If, at decision block 404, the BIOS determines that the storage device(s) have been unlocked, the method 400 proceeds to block 406 where the BIOS retrieves primary OS information from the storage device(s). In an embodiment, at block 408, the BIOS 308 may operate to retrieve the primary OS information stored on the storage device(s) 306. As would be understood by one of skill in the art in possession of the present disclosure, following the unlocking of the storage device(s) 306 by the remote access controller device 304 at block decision block 404, the BIOS 308 will have access to the storage device(s) 306, and thus may access those storage device(s) 306 and retrieve any boot information (including the primary OS information discussed above) stored thereon.

The method 400 then proceeds to block 408 where the BIOS boots using the primary OS information to provide a primary OS. In an embodiment, at block 408, the BIOS 308 may utilized the primary OS information retrieved at block 406 in order to provide a primary OS on the server device 206*a*/300 during runtime. For example, the BIOS may utilize the primary OS information to complete boot operations for the server device 206*a*/300, which results in the control of the server device 206*a*/300 being provided by the primary OS during a runtime state of the server device 206*a*/300. While discussed as retrieving the primary OS information and performing boot operations using that primary OS information to provide the primary OS, one of skill in the art in possession of the present disclosure will recognize that the BIOS 308 may retrieve any boot information from the storage device(s) 306 at block 406, and perform boot operations using any of that boot information in order to place the server device 206*a*/300 in a runtime state. Following block 408, the server device 206*a* may perform any of a variety of conventional server device functionality that would be apparent to one of skill in the art in possession of the present disclosure.

If, at decision block 404, the BIOS determines that storage device(s) have not been unlocked, the method 400 proceeds to block 410 where the BIOS retrieves secondary OS information, and block 412 where the BIOS boots using the secondary OS information to provide a secondary OS. In an embodiment, at blocks 410 and 412, the BIOS 308 may operate to retrieve the secondary OS information and use that secondary OS information during the booting operations to provide a secondary OS. In some embodiments, in response to determining that the storage device(s) 306 have not been unlocked, the BIOS 308 may operate to re-enumerate a boot order for the server device 206*a*/300 in order to provide the storage location of the secondary OS information at that top of that boot order. For example, the server device may include an initial boot order such as "1. Internal Solid State Drive (SDD), 2. Compact Disk (CD)/Digital Video Disk (DVD) Drive, 3. Onboard Network Interface Controller (NIC), and 4. Universal Serial Bus (USB) Drive" (each of which are visible to a user of the server device 206*a*/300), and in response to determining that the storage device(s) 306 (e.g., including an Internet SSD in this example) have not been unlocked at decision block 404, the BIOS 308 may re-enumerate the initial boot order to provide a re-enumerated boot order that includes the storage location of the secondary OS information in the first slot of the boot order. In particular, the storage location of the secondary OS information may not be visible to a user of the server device 206*a*/300 in order to make the secondary OS provided from that secondary OS information "hidden", as it is only available as part of the re-enumerated boot order provided by the BIOS 308. As such, the Internal SSD in the example below may be replaced by the BIOS storage system 314 (e.g., the BIOS SPI storage device, the IDSDM storage device, the vFlash storage device), or the network boot system 208 (e.g., the PXE boot system). As would be understood by one of skill in the art in possession of the present disclosure, the re-enumeration of the boot order of the server device 206*a*/300 may cause further boot operations by the BIOS 308 to access the storage location provided in the first slot of the boot order.

As such, at blocks 410 and 412, the BIOS 308 may access the storage location that includes the secondary OS information. Continuing the examples above in which the secondary OS information is stored locally on the server device 206*a*/300, the BIOS 308 may access the BIOS storage system 314 (e.g., the BIOS SPI storage device, the IDSDM storage device, the vFlash storage device) and retrieve the secondary OS information stored thereon. In some examples, the secure boot engine 308*b* in the BIOS 308 may retrieve the secure boot certificate that was stored in the BIOS secure boot database section of the BIOS 308, and use that secure boot certificate to verify the authenticity of the secondary OS information retrieved from the BIOS storage system 314. Continuing the examples above in which the secondary OS information is stored outside of the server device 206*a*/300, the BIOS 308 may communicate via the network 204 with the network boot system 208 (e.g., the PXE boot system) and retrieve the secondary OS information (e.g., via a transmission by the network boot system 208 of that secondary OS information through the network 204). In some examples, the secure boot engine 308*b* in the BIOS 308 may retrieve the secure boot certificate that was stored in the BIOS secure boot database section of the BIOS 308, and use that secure boot certificate to verify the authenticity of the secondary OS information received from the network boot system 208.

Once the secondary OS information has been retrieved, the BIOS 308 may complete boot operations, which may include utilizing the secondary OS information to provide instructions on a memory system in the server device 206/300 (not illustrated, but which may include the memory 114 discussed above with reference to FIG. 1) that, when executed by the processing system 312, cause the processing system to provide the secondary OS engine 316 that provides the secondary OS discussed herein. As such, following block 412, a hidden, UEFI-compliant secure-boot-enabled, micro embedded OS (which may be an LINUX OS) may control the operations of the server device 206*a*/300.

The method 400 then proceeds to block 414 where the secondary OS retrieves storage device locking key(s). In an embodiment, at block 414, the secondary OS engine 316 operates to provide a secondary OS that is configured to retrieve the storage device locking key(s) for the storage device(s) 306. For example, when the key management system 202 and a network connection (e.g., via the communication system 318) to the key management system 202 are each available, the locking key retrieval engine 316*a* provided by the secondary OS engine 316 may operate to use the communication system 318 to retrieve the storage device locking key(s) for the storage device(s) 306. For example, the locking key retrieval engine 316*a* may act as a KMIP client that communicates via the communication system 318 and through the network 204 with the key management system 202 acting as a KMIP server in order to retrieve the storage device locking key(s) for the storage device(s) 306 and store those storage device locking key(s) in the locking key cache 316*c*. While not described in detail herein, one of skill in the art in possession of the present disclosure will recognize how a KMIP client may operate in a variety of manners to retrieve device locking keys from a KMIP server.

In examples in which the key management system 202 and/or a network connection (e.g., via the communication system 318) to the key management system 202 are not available, the certificate management subsystem 316*d* provided by the secondary OS engine 316 may operate to retrieve the encrypted device locking key(s) that were stored in the BIOS UEFI runtime store, as well as the secure boot certificate stored in the BIOS secure boot database section, and use that secure boot certificate (e.g., a private key associated with the secure boot certificate) to decrypt the encrypted storage device locking keys in order to provide the device locking key(s) for the storage device(s) 306, and store those storage device locking key(s) in the locking key cache 316*c*.

The method 400 then proceeds to block 416 where the secondary OS uses the storage device locking key(s) to unlock storage device(s). In an embodiment, at block 416, the locking engine 316*b* provided by the secondary OS engine 316 may use the device locking key(s) stored in the locking key cache 316*c* in order to unlock the storage device(s) 306. While not described in detail herein, one of skill in the art in possession of the present disclosure will recognize how a locking engine such as an RTCEM may operate to unlock devices using device locking keys.

The method 400 then proceeds to block 418 where the secondary OS performs reboot operations. In an embodiment, at block 418 and following the unlocking of the storage device(s) 306 at block 416, the secondary OS engine 316 operates to perform reboot operations that result in the BIOS 308 being loaded such that the BIOS 308 may again perform the booting operations for the server device 206a/300. In some embodiments, the BIOS 308 may operate to re-enumerate the boot order of the server device 206a/300 so that the storage device(s) 306 (e.g., the Internal SDD(s) in the example above) are located at the top of that boot order and will be accessed by the BIOS 308 to perform booting operations using the primary OS information stored on those storage device(s) 306. The method 400 then returns to block 406 where the BIOS 308 retrieves primary OS information from the storage device(s) 306 in substantially the same manner as discussed above, and proceeds to block 408 where the BIOS 308 boots using the primary OS information to provide the primary OS in substantially the same manner as discussed above.

Thus, systems and methods have been described that include a hidden, UEFI-compliant secure-boot-enabled, micro embedded secondary Operating System (OS) that is provided by secondary OS information that may be stored locally, or that may be available through a network. During boot operations, the BIOS may request a remote access controller device to unlock a storage device using a storage device locking key stored in a network-connected key management system so that boot information needed to complete the boot operations may be accessed. If the storage device is not unlocked, the BIOS may then re-enumerate a boot order to allow boot operations to be performed using the local storage location of the secondary OS information, or the network storage location of the secondary OS information, which allows for booting using the secondary OS information to provide the secondary OS. If a network connection and the key management system are available, the secondary OS may then retrieve the device locking key from the key management system and use it to unlock the storage devices. If the network connection and/or key management system are unavailable, the secondary OS may decrypt an encrypted device locking key that is stored locally, and use the decrypted device locking key to unlock the storage device. The secondary OS then performs a reboot operation, which again loads the BIOS so that the BIOS may retrieve primary OS information from the unlocked storage devices, and boot using that primary OS information in order to provide a primary OS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secondary Operating System (OS) device unlocking system, comprising:
   a key management system; and
   a server device that is coupled to the key management system via a network;
   wherein the server device includes:
      a storage device storing primary Operating System (OS) information for providing a primary OS;
      a remote access controller device; and
      a Basic Input/Output System (BIOS) that is coupled to the storage device and the remote access controller device, wherein the BIOS is configured, during server device initialization operations, to:
         send, to the remote access controller device, a request to unlock the storage device using a storage device locking key stored in the key management system;
         determine, in response to a timeout condition being satisfied after the request was sent to the remote access controller device, that the storage device is locked;
         retrieve, in response to the storage device being locked, secondary OS information for providing a secondary OS;
         boot using the secondary OS information to provide the secondary OS that is configured to:
            retrieve the storage device locking key;
            unlock, using the storage device locking key, the storage device; and
            perform, subsequent to unlocking the storage device, a reboot operation;
         retrieve, following the reboot operation and from the storage device that was unlocked by the secondary OS, the primary OS information; and
         boot using the primary OS information to provide the primary OS.

2. The system of claim 1, wherein the secondary OS is configured to:
   retrieve the storage device locking key via the network from the key management system.

3. The system of claim 1, wherein the secondary OS is configured to:
   retrieve an encrypted storage device locking key from a BIOS storage system; and
   decrypt the encrypted storage device locking key to provide the storage device locking key.

4. The system of claim 1, wherein the secondary OS is a hidden, secure, embedded operating system.

5. The system of claim 1, wherein the BIOS is configured, during the server device initialization operations, to:
   retrieve the secondary OS information from a BIOS storage system; and
   use a secure boot certificate to securely boot the secondary OS using the secondary OS information.

6. The system of claim 1, wherein the BIOS is configured, during the server device initialization operations, to:
   change, in response to the storage device being locked, a boot order for the server device, wherein the changed boot order causes the BIOS to retrieve the secondary OS information for providing the secondary OS.

7. An Information Handling System (IHS), comprising:
   a processing system; and
   a memory system that is coupled to the processing system and that includes instructions that, when executed by the processing system, cause the processing system to provide a Basic Input/Output System (BIOS) that is configured, during initialization operations, to
      send, to a remote access controller device, a request to unlock a storage device using a storage device locking key that is stored in a key management system;
      determine, in response to a timeout condition being satisfied after the request was sent to the remote access controller device, that the storage device is locked;
      retrieve, in response to the storage device being locked, secondary OS information for providing a secondary OS;

boot using the secondary OS information to provide the secondary OS that is configured to:
  retrieve the storage device locking key;
  unlock, using the storage device locking key, the storage device; and
  perform, subsequent to unlocking the storage device, a reboot operation; and
retrieve, following the reboot operation and from the storage device that was unlocked by the secondary OS, primary OS information for providing a primary OS; and
boot using the primary OS information to provide the primary OS.

8. The IHS of claim 7, wherein the secondary OS is configured to:
retrieve the storage device locking key via a network from the key management system.

9. The IHS of claim 7, wherein the secondary OS is configured to:
retrieve an encrypted storage device locking key from a BIOS storage system; and
decrypt the encrypted storage device locking key to provide the storage device locking key.

10. The IHS of claim 7, wherein the secondary OS is a hidden, secure, embedded operating system.

11. The IHS of claim 7, wherein the BIOS is configured, during the initialization operations, to:
retrieve the secondary OS information from a BIOS storage system; and
use a secure boot certificate to securely boot the secondary OS using the secondary OS information.

12. The IHS of claim 11, wherein the BIOS storage system is a Serial Peripheral Interface (SPI) storage device.

13. The IHS of claim 7, wherein the BIOS is configured, during the initialization operations, to:
change, in response to the storage device being locked, a boot order, wherein the changed boot order causes the BIOS to retrieve the secondary OS information for providing the secondary OS.

14. A method for providing device unlocking via a secondary Operating System (OS), comprising:
sending, by a Basic Input/Output System (BIOS) to a remote access controller device, a request to unlock a storage device using a storage device locking key that is stored in a key management system;
determining, by the BIOS in response to a timeout condition being satisfied after the request was sent to the remote access controller device, that the storage device is locked;
retrieving, by the BIOS in response to the storage device being locked, secondary OS information for providing a secondary OS;
booting, by the BIOS, using the secondary OS information to provide the secondary OS that is configured for:
  retrieving, by the secondary OS, the storage device locking key;
  unlocking, by the secondary OS using the storage device locking key, the storage device;
  performing, by the secondary OS subsequent to unlocking the storage device, a reboot operation;
retrieving, by the BIOS following the reboot operation and from the storage device that was unlocked by the secondary OS, primary OS information for providing a primary OS; and
booting, by the BIOS, using the primary OS information to provide the primary OS.

15. The method of claim 14, further comprising:
retrieving, by the secondary OS, the storage device locking key via a network from the key management system.

16. The method of claim 14, further comprising:
retrieving, by the secondary OS, an encrypted storage device locking key from a BIOS storage system; and
decrypting, by the secondary OS, the encrypted storage device locking key to provide the storage device locking key.

17. The method of claim 14, wherein the secondary OS is a hidden, secure, embedded operating system.

18. The method of claim 14, further comprising:
retrieving, by the BIOS, the secondary OS information from a BIOS storage system; and
using, by the BIOS, a secure boot certificate to securely boot the secondary OS using the secondary OS information.

19. The method of claim 18, wherein the BIOS storage system is a Serial Peripheral Interface (SPI) storage device.

20. The method of claim 14, further comprising:
changing, by the BIOS in response to the storage device being locked, a boot order, wherein the changed boot order causes the BIOS to retrieve the secondary OS information for providing the secondary OS.

* * * * *